Feb. 2, 1971 P. T. DAY, JR 3,559,355
BUILDING CONSTRUCTION SYSTEM AND COMPONENTS THEREFOR
Filed March 10, 1966 13 Sheets-Sheet 1
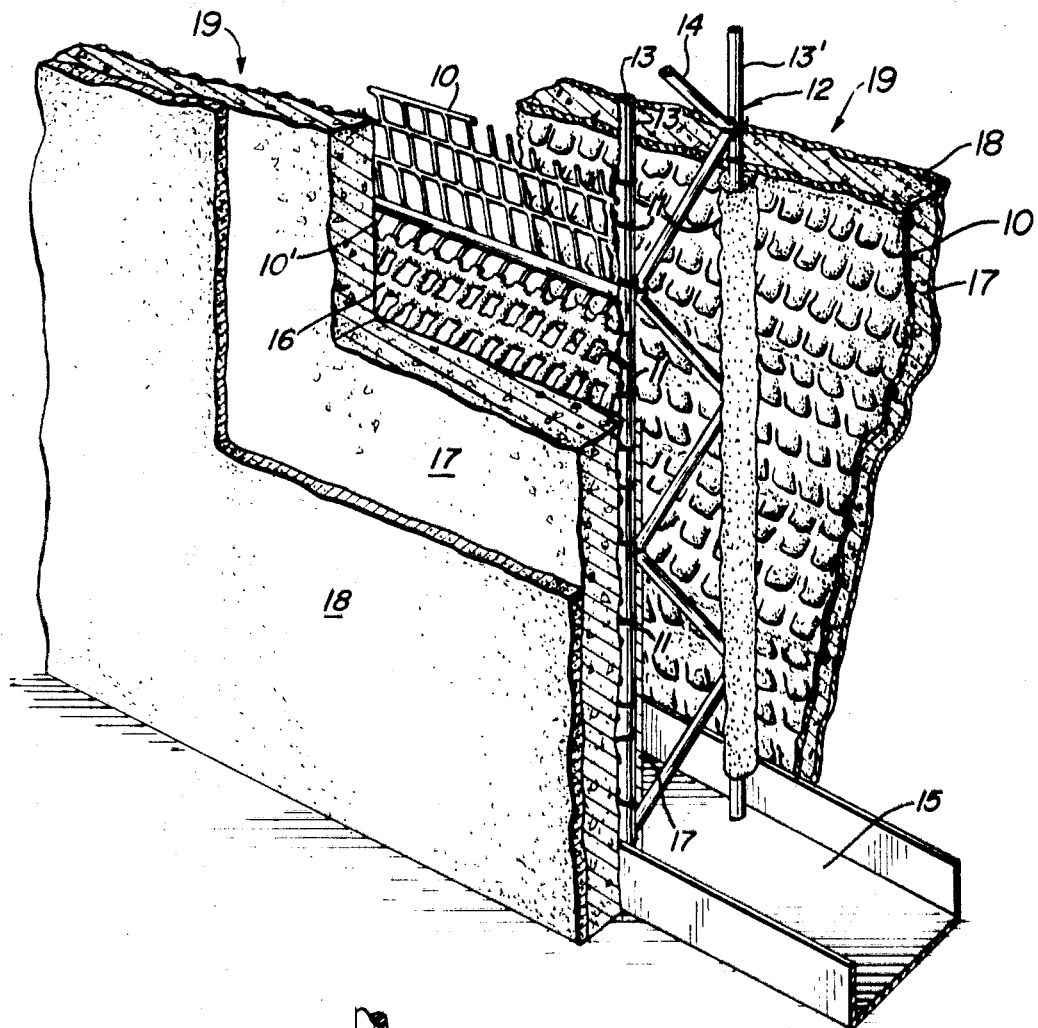
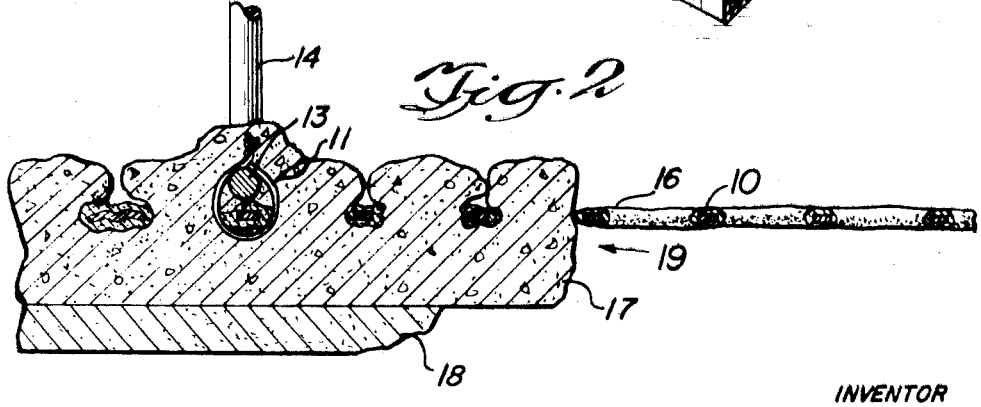

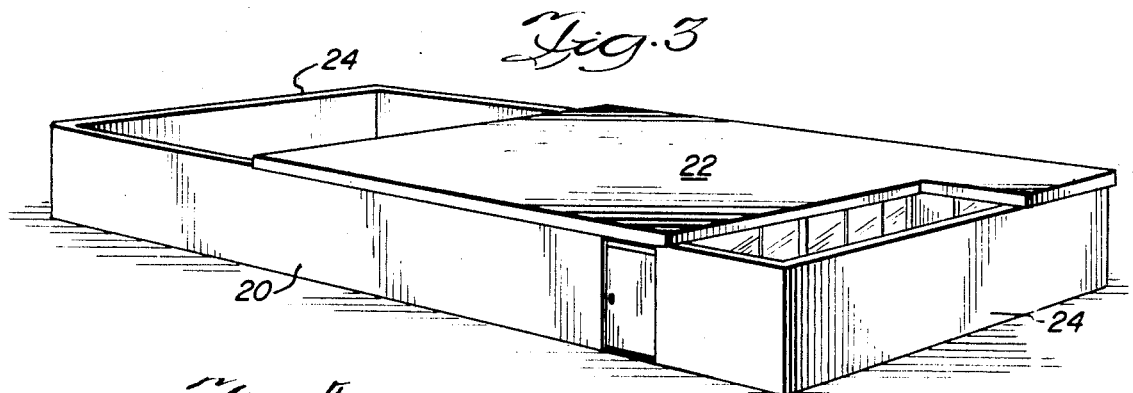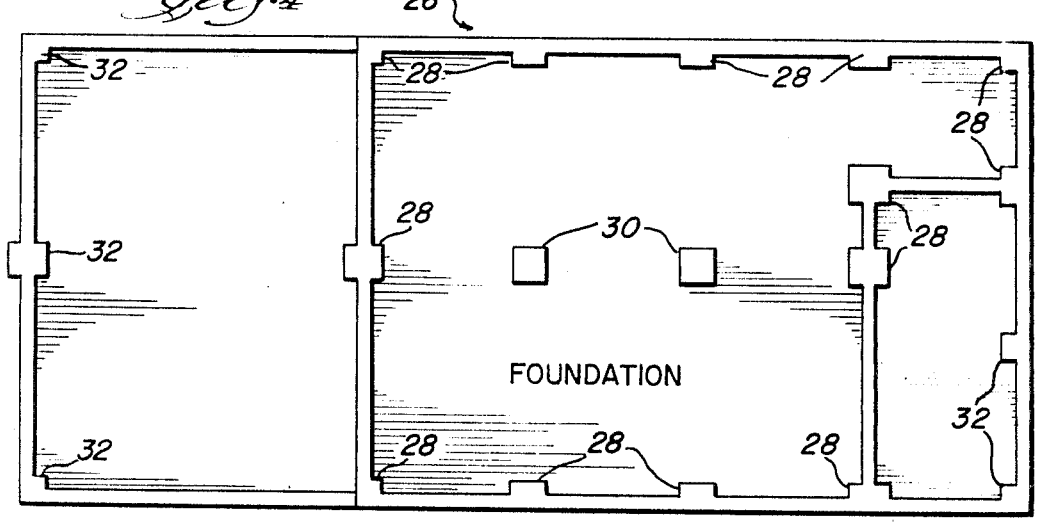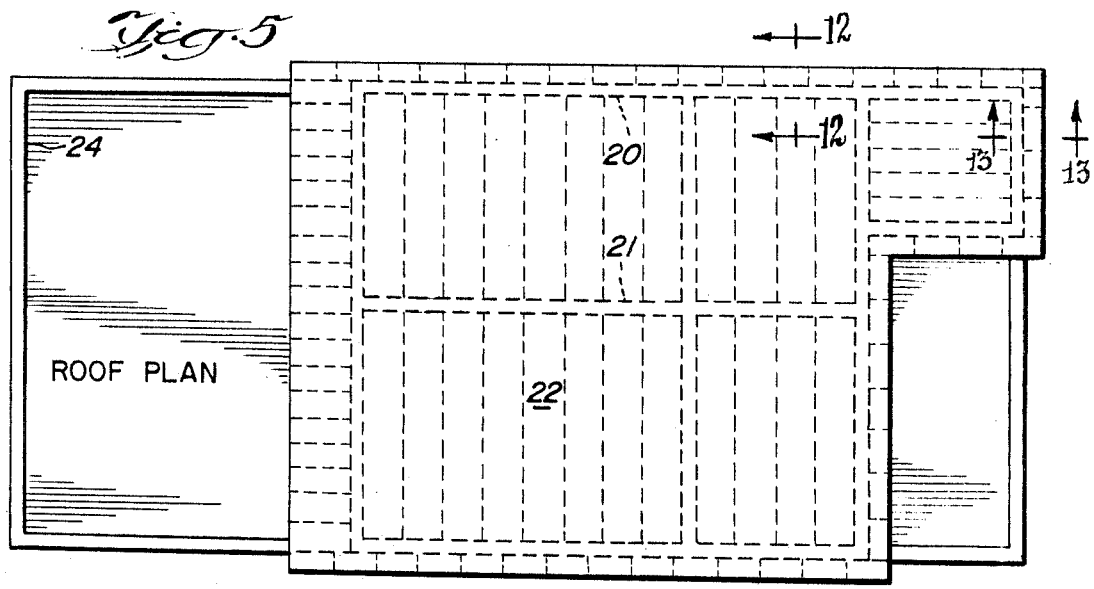

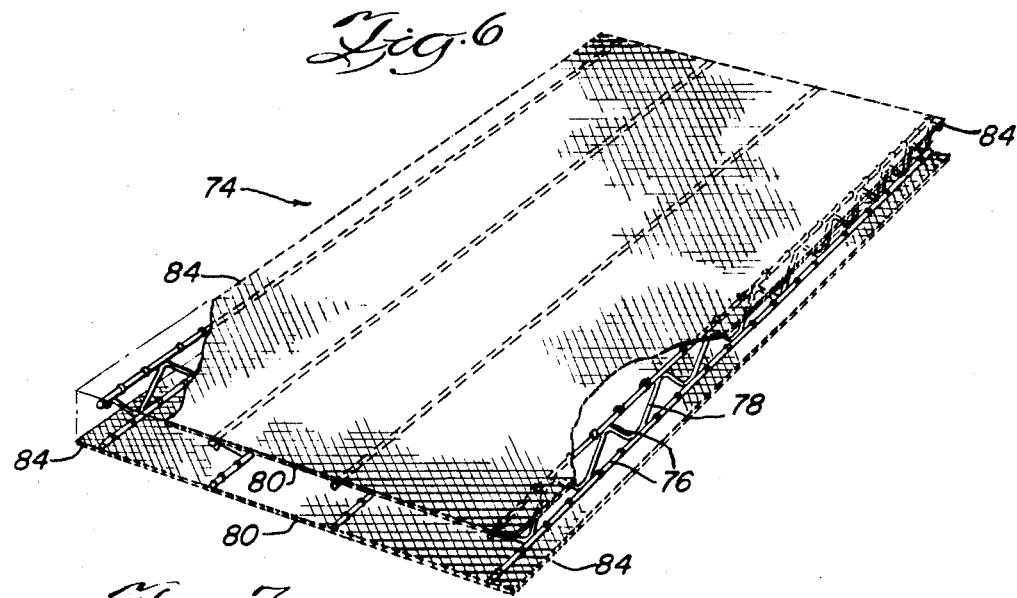
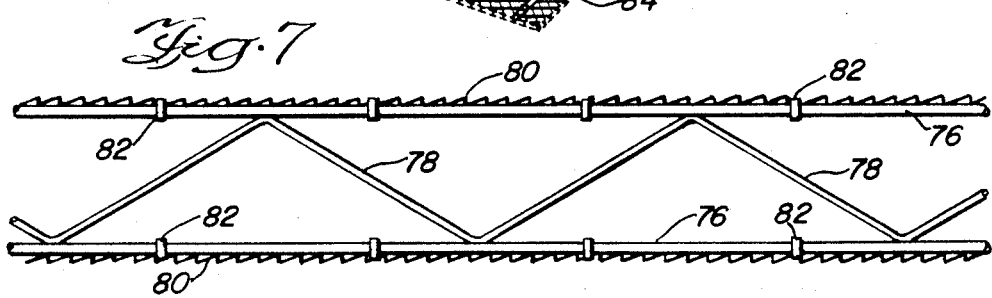
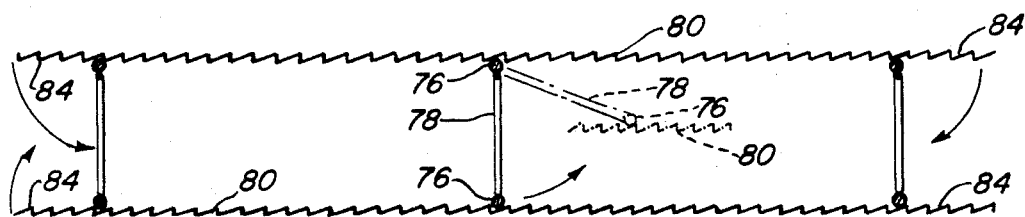
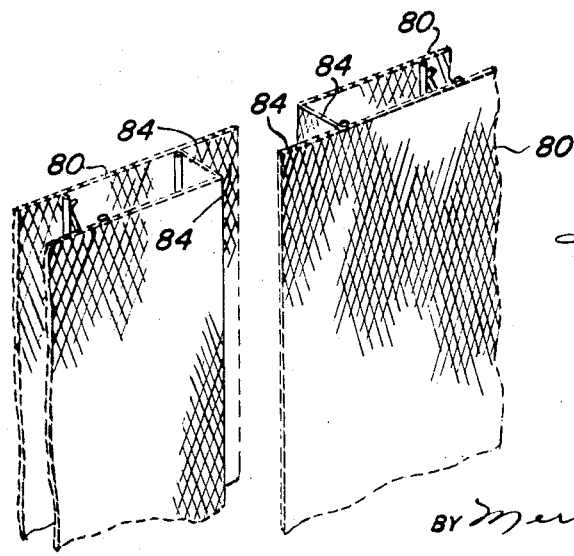

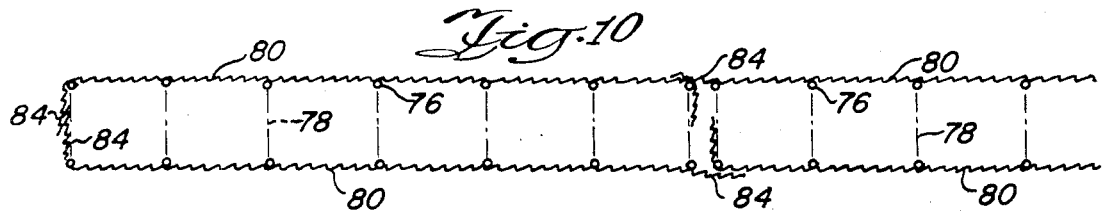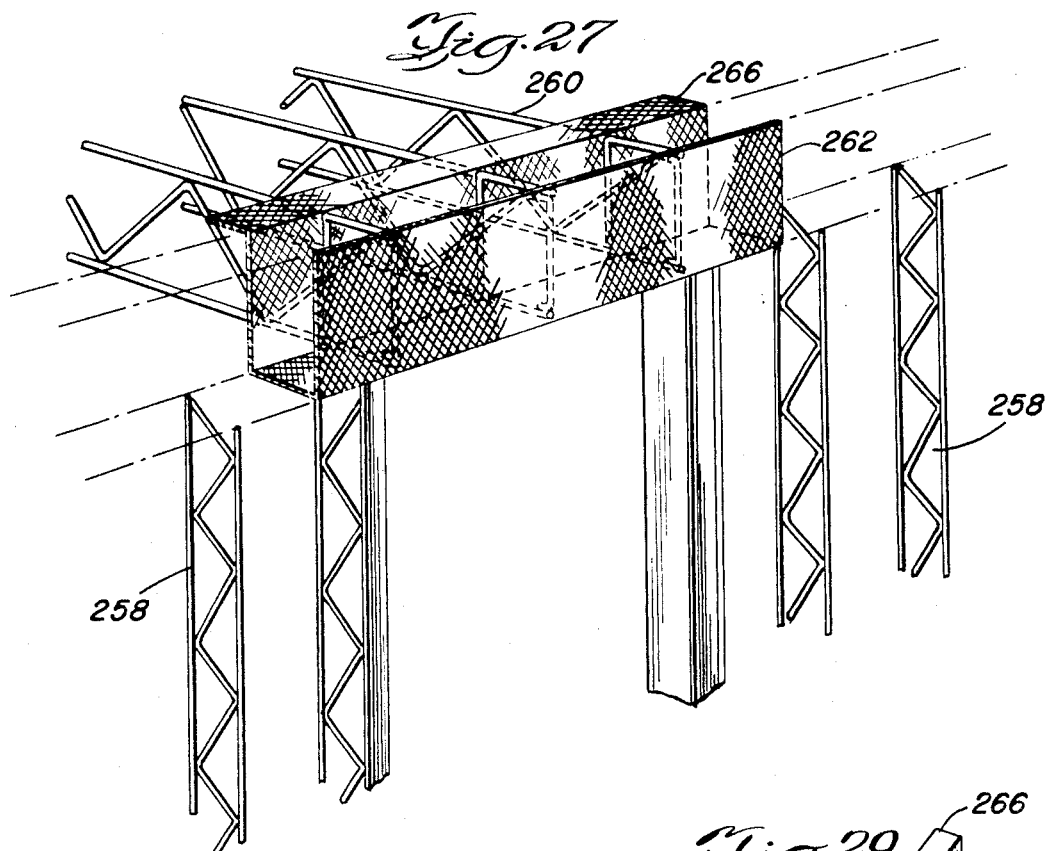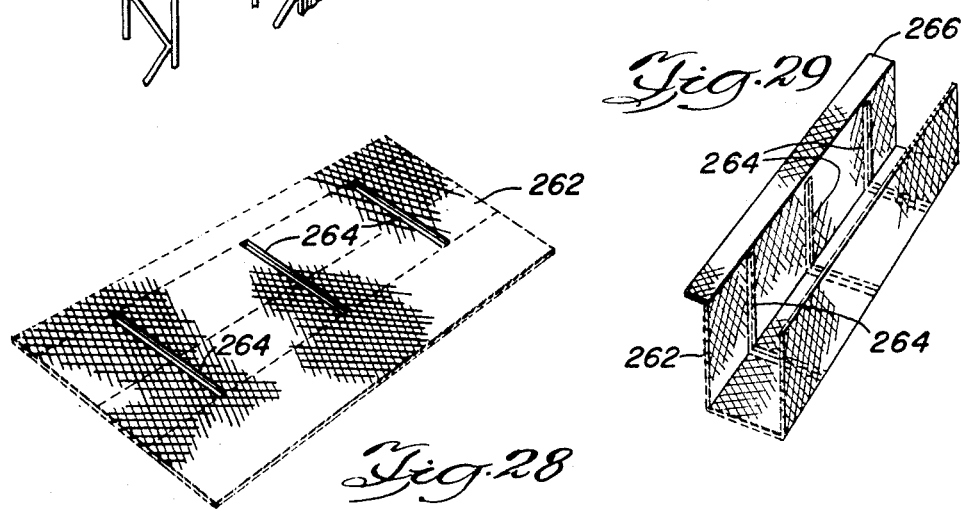

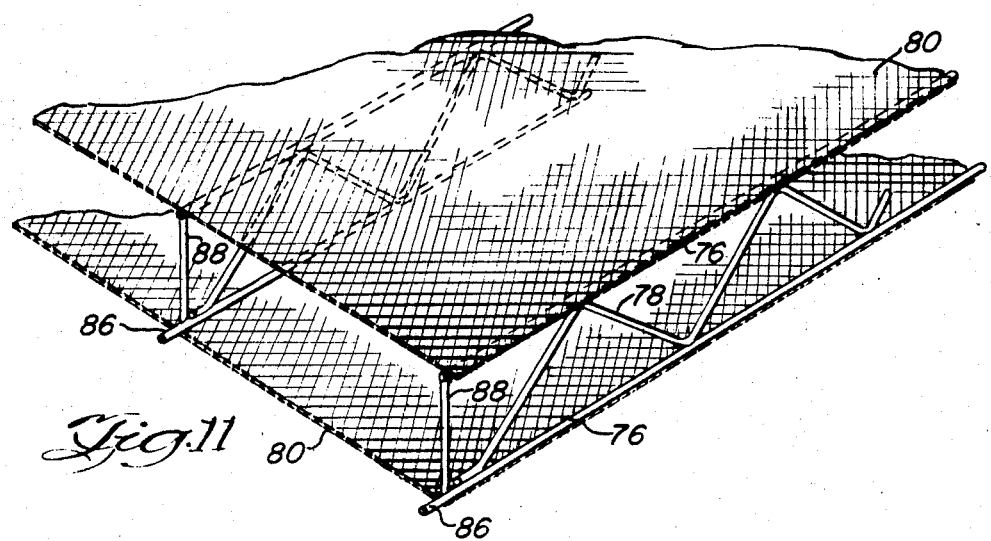
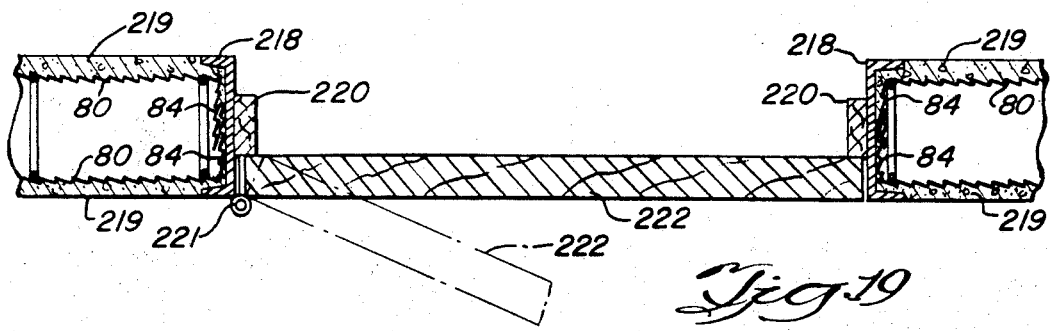
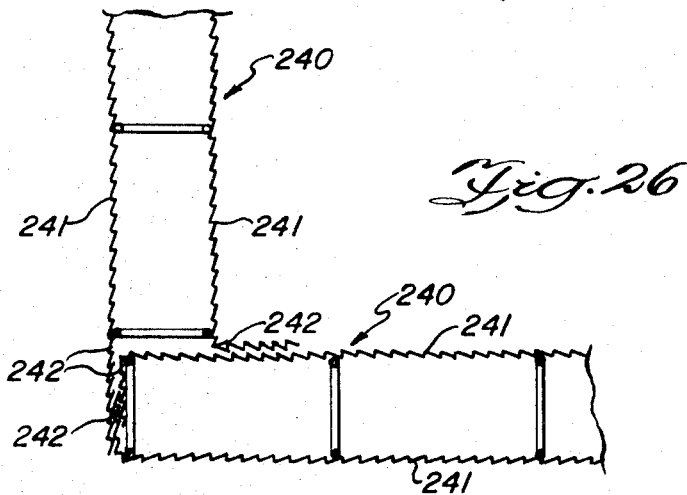

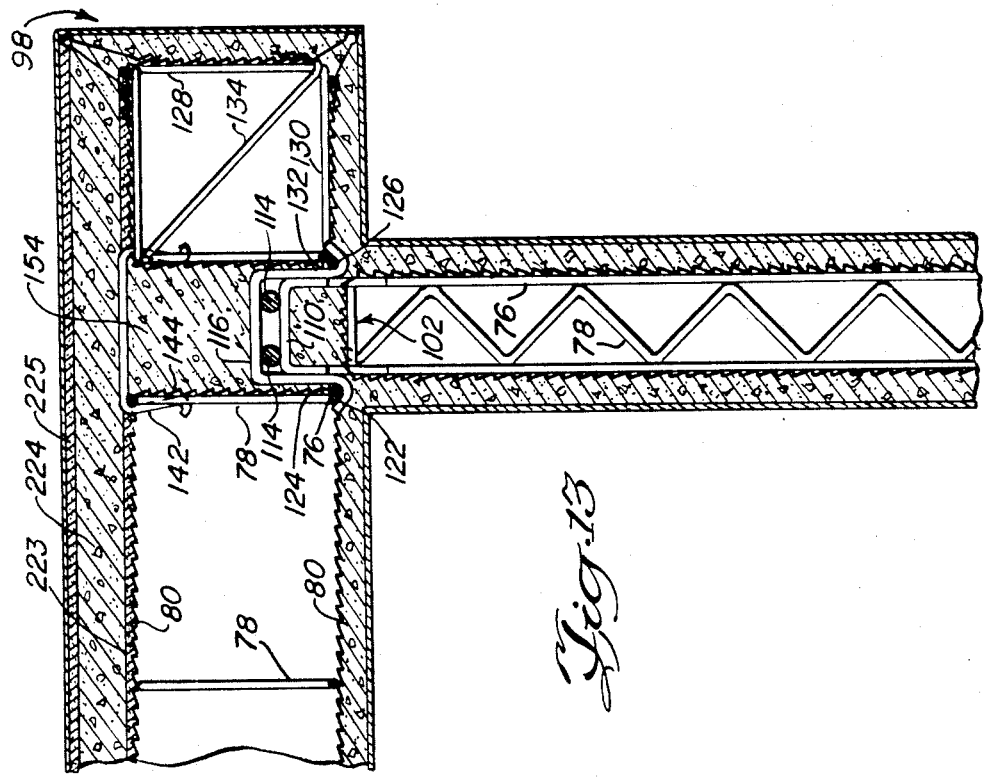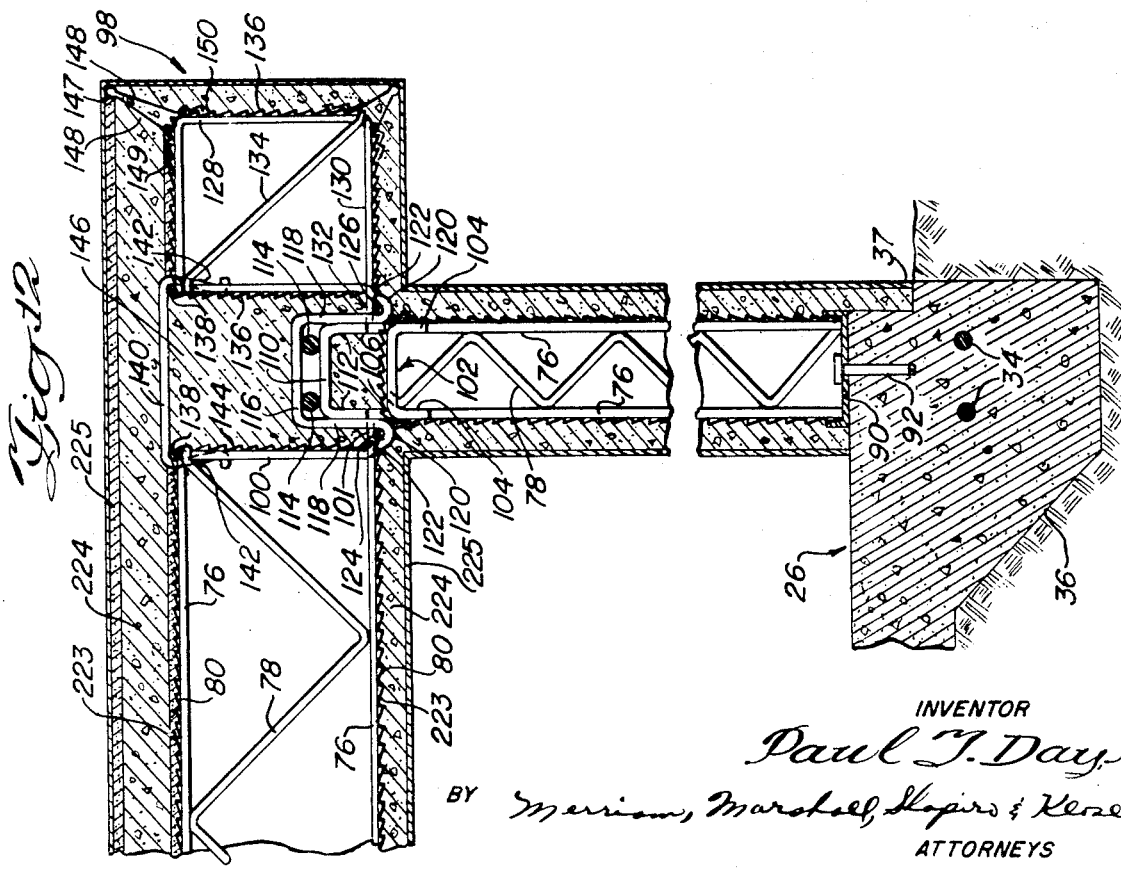

Feb. 2, 1971  P. T. DAY, JR  3,559,355
BUILDING CONSTRUCTION SYSTEM AND COMPONENTS THEREFOR
Filed March 10, 1966  13 Sheets-Sheet 8
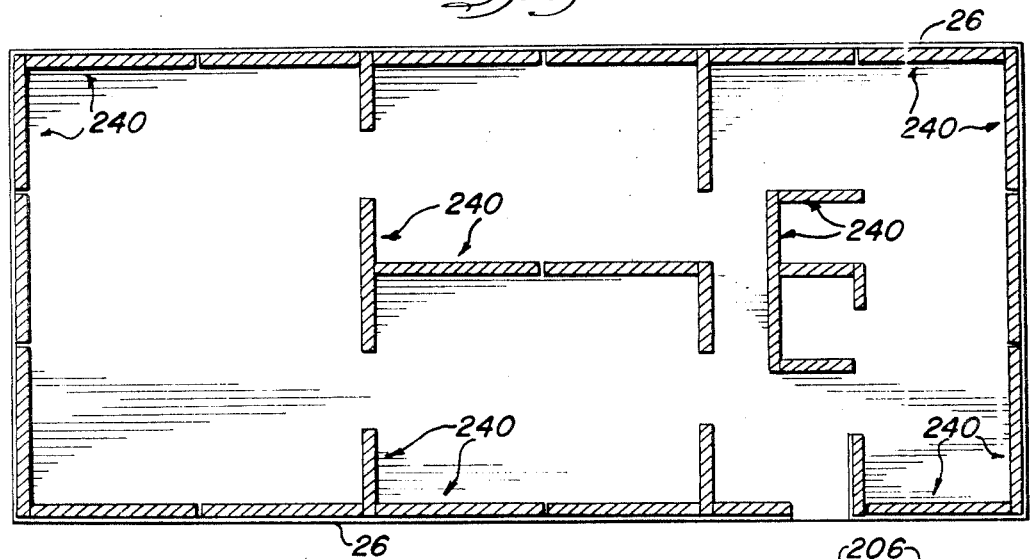
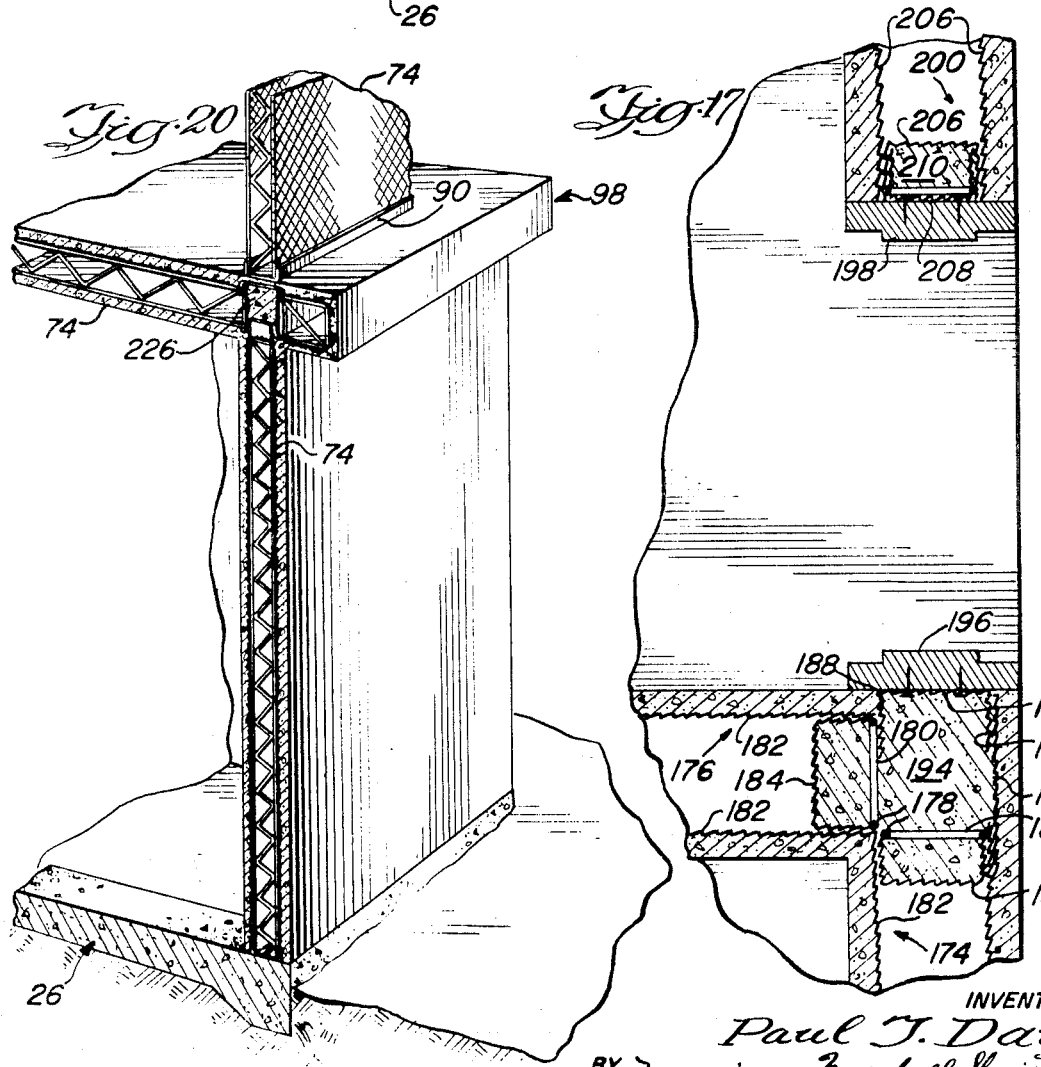
INVENTOR
Paul T. Day Jr
BY Merriam, Marshall, Shapiro & Klose
ATTORNEYS Feb. 2, 1971  P. T. DAY, JR  3,559,355
BUILDING CONSTRUCTION SYSTEM AND COMPONENTS THEREFOR
Filed March 10, 1966  13 Sheets-Sheet 9

INVENTOR
Paul T. Day Jr.
BY Merriam, Marshall, Shapiro & Klose
ATTORNEYS

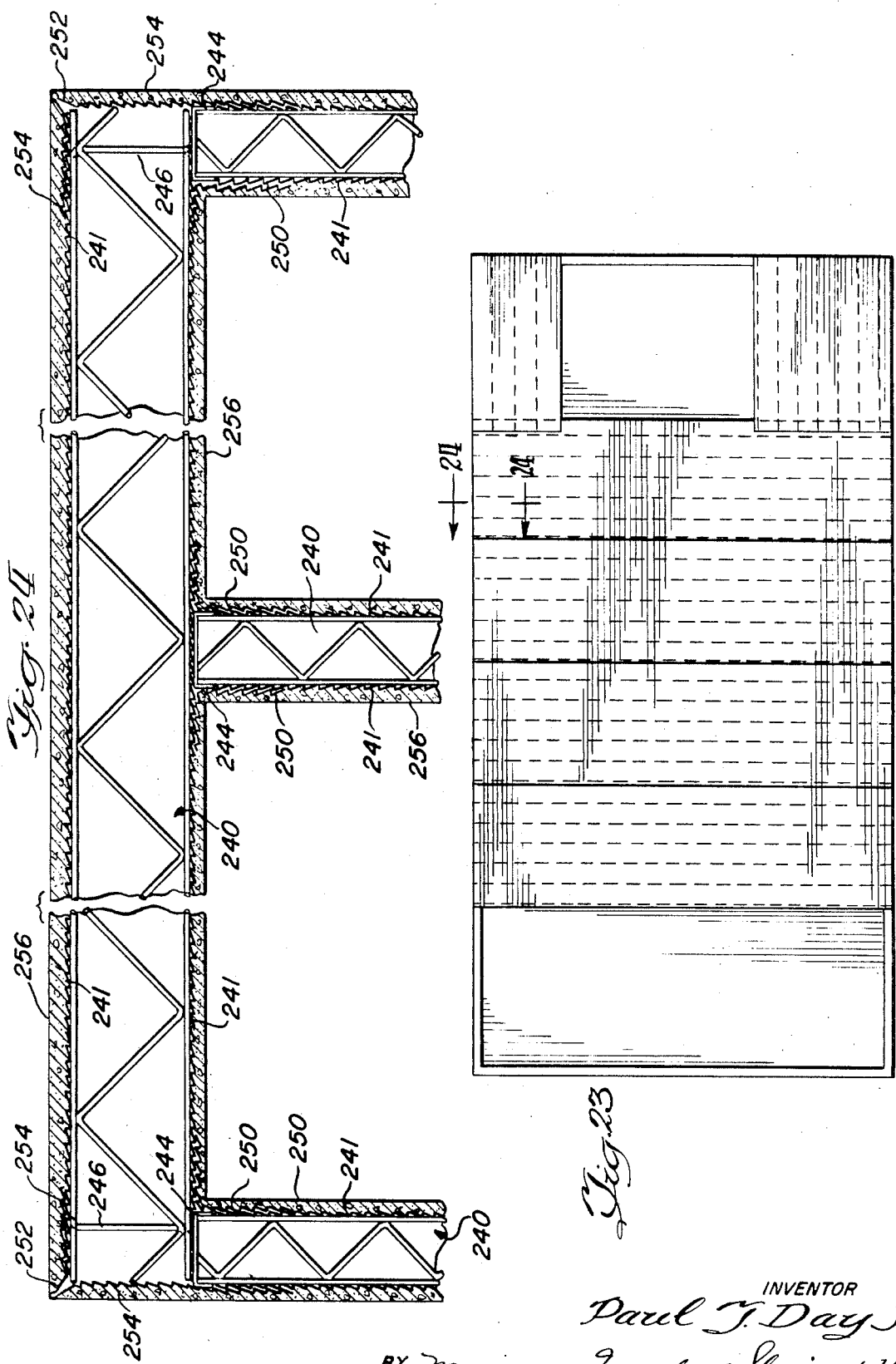

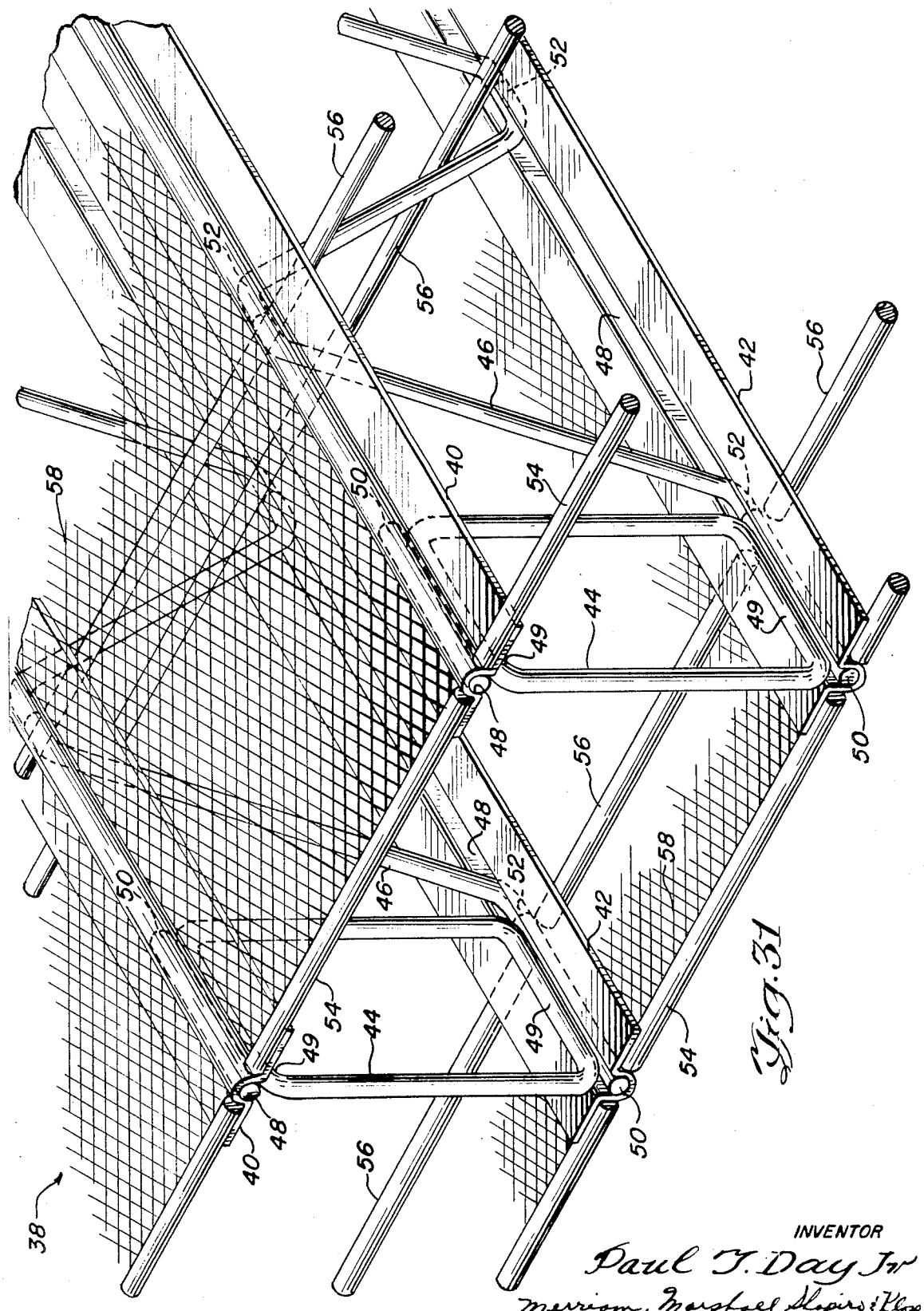

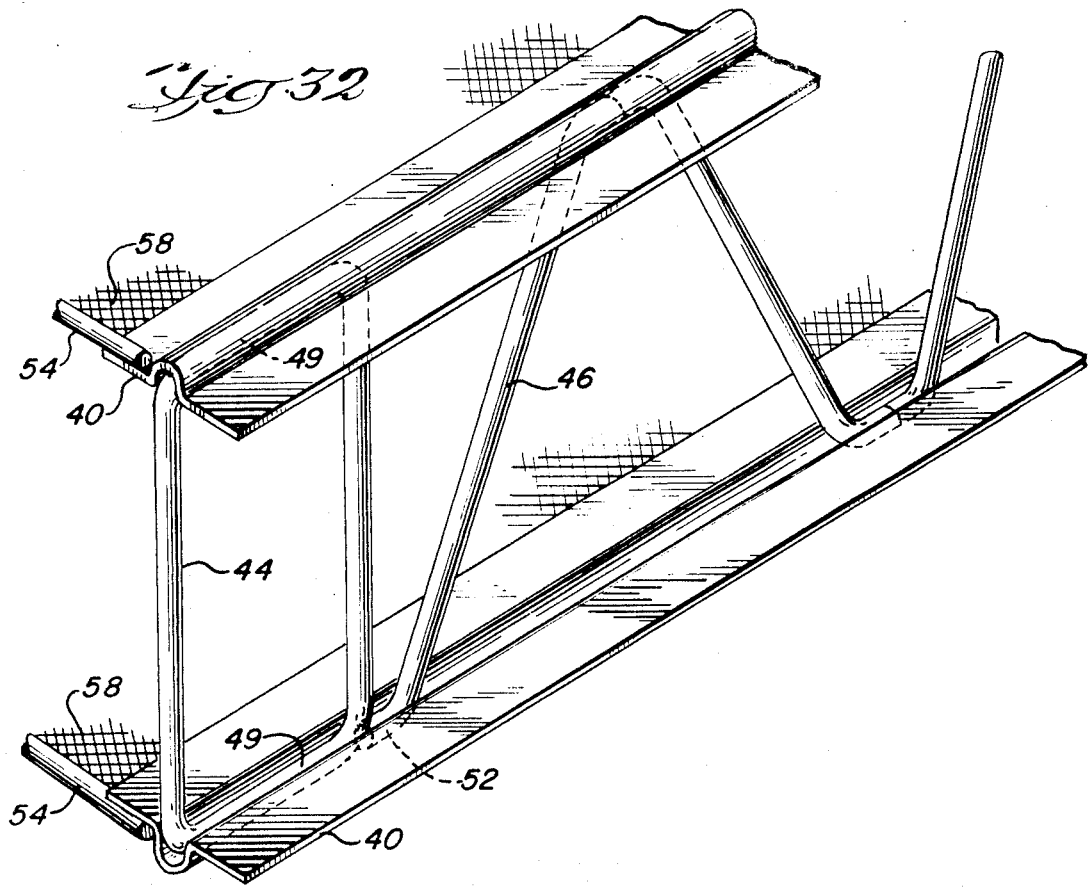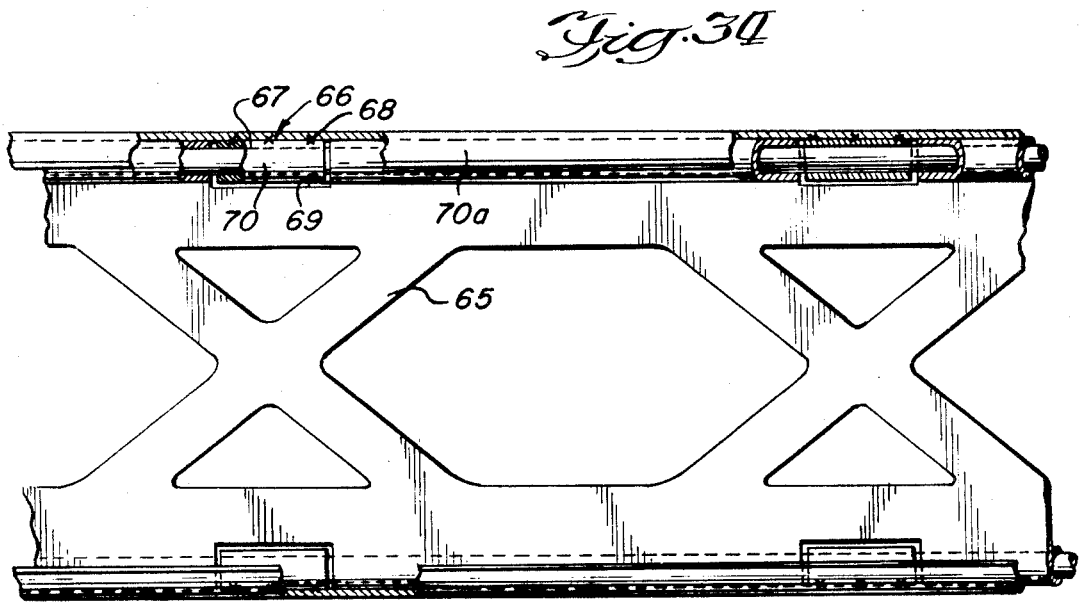

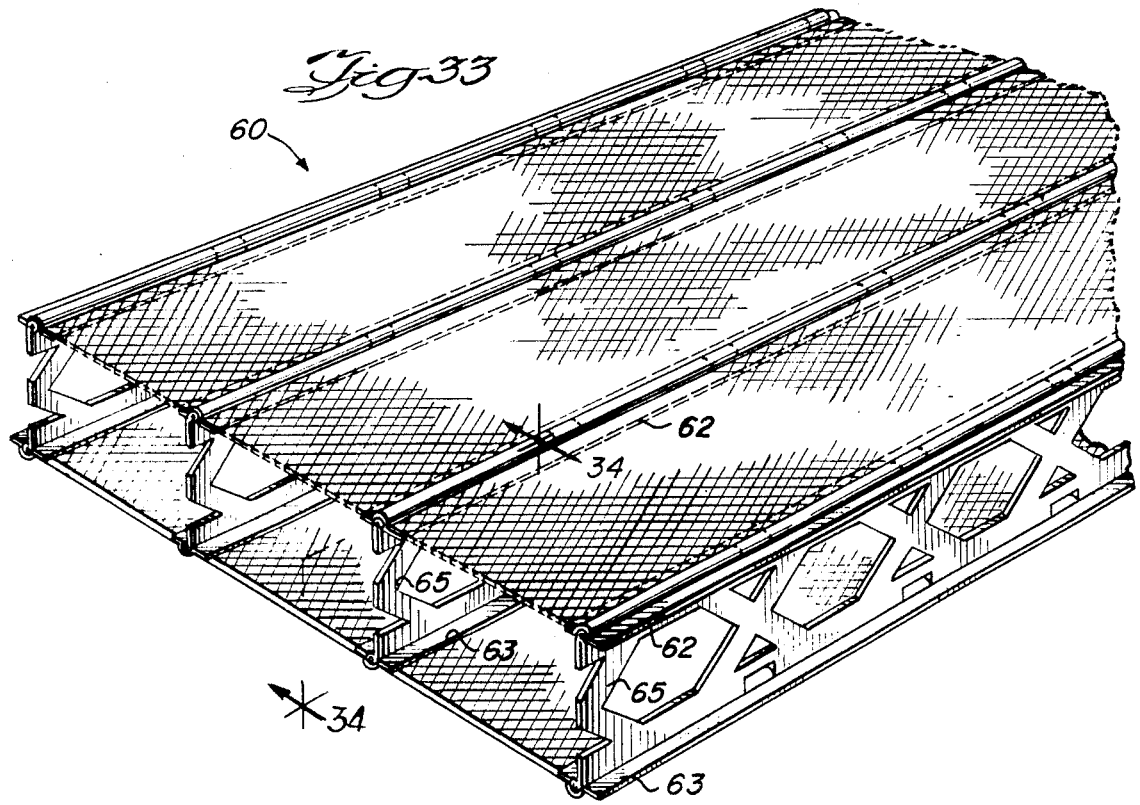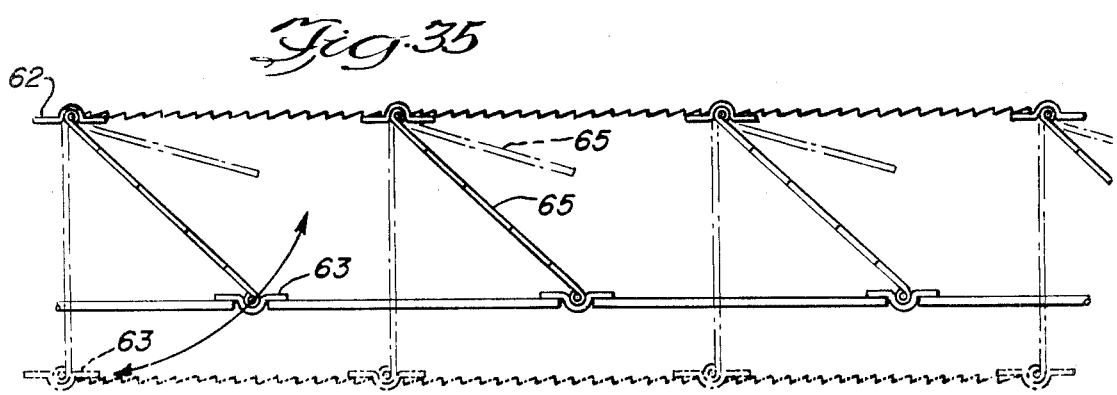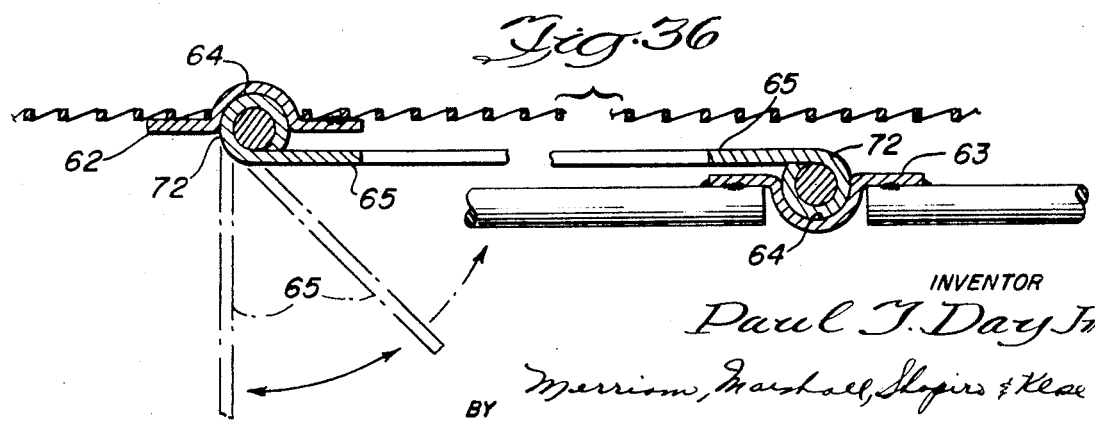

United States Patent Office 3,559,355
Patented Feb. 2, 1971

3,559,355
BUILDING CONSTRUCTION SYSTEM AND
COMPONENTS THEREFOR
Paul Thorndyke Day, Jr., Baltimore, Md., assignor to
Inland-Ryerson Construction Products Company, Milwaukee, Wis., a corporation of Delaware
Continuation-in-part of applications Ser. No. 367,849,
May 15, 1964, and Ser. No. 421,250, Dec. 28, 1964.
This application Mar. 10, 1966, Ser. No. 533,356
Int. Cl. E04b 1/20, 1/16; E04c 2/42
U.S. Cl. 52—251      4 Claims

ABSTRACT OF THE DISCLOSURE

A composite, structural load bearing building unit having membrane panels separated by lightweight spacer members, the membrane panels having a reticulated subform covered with a skin of cementitious material to provide a composite structure which is capable of supporting loads much greater than the capability of the lightweight spacer members. A building system with interconnected composite structural assemblies.

This application is a continuation-in-part of my copending applications Ser. No. 367,849 filed May 15, 1964, now abandoned and Ser. No. 421,250 filed Dec. 28, 1964, now U.S. Pat. No. 3,344,571.

This invention relates to a building system. More particularly, this invention relates to a building of low cost formed from prefabricated elements which are modified to form load bearing, composite structural panel units. In its more specific aspect, this invention relates to a low cost building erected using an easily assembled load bearing composite structural building panel system from prefabricated subforms to which are applied and integrated therewith cementitious materials of construction.

The primary purpose of this invention is to provide a low cost building formed from composite structural building units having low weight and high load bearing properties. The basic structural unit is fabricated by a pair of spaced apart cementitious membrane panels which are integrally attached to an intermediate spacer element in a single, structural element. The membrane panels in the unit comprise a reticulated subform, such as expanded metal lath, integrally attached to a lightweight intermediate member such as a lightweight open web truss. The subform is initially covered with a prime coat, and thereafter with a continuous skin, of a cementitious material of construction having a suitable compressive strength. The structural unit which can be used for load bearing walls, floors, or roof panels can utilize the optimum physical properties of two of the most commonly used materials existent today—concrete and steel. By utilizing the optimum physical properties of each material, the system enables the designer to achieve maximum structural resistance with a minimum amount of materials and weight.

Independently, the components of the system have a limited amount of structural value. Compositely, however, the system is capable of resisting a wide variety of loads such as flexural, axial, shear, seismic, or a combination of such loads.

The intermediate spacer members and reticulated subform employed in assembling the unit perferably are prefabricated into collapsible panels which are exceptionally light in weight. For example, panels can be fabricated weighing 1.7 pounds per square foot and wall panels can be fabricated weighing 1.6 pounds per square foot. The panels, which are quite flexible individually, become quite rigid when erected and tied together to serve as the subform for applying the cementitious covering skin. Once set and cured, the components of the structural unit react compositely in resisting applied forces. When the spacer members and reticulated subform are assembled to form a frame, the resulting subassembly is wholly capable of resisting the dead load of the applied cementitious coating and loads exerted by the workmen involved in the building construction without an undue amount of distortion or conventional bracing.

In one series of tests, a roof panel fabricated in accordance with this invention and tested for seven days reisted loads of 184 p.s.f. without reaching ultimate failure. The panel was tested over two spans spaced 10'-0" O.C.

In general, when the load bearing composite structural unit of this invention is employed in building construction, a suitable foundation is provided to which the units forming the wall panels are anchored in a vertical position to form the walls of the building. A roof structure is formed by supporting the structural units horizontally on the vertical panels.

In practice a substructure consisting essentially of a subassembly of reticulated subform and space members is erected to form a base building unit, either a complete single story unit or a single floor unit of a multiple story building. A cementitious material such as a Portland cement-sand mixture is applied, preferably by mechanically spraying, to the reticulated subform.

If desired, a post and beam construction can be provided to supplement the load bearing ability of the structural building unit of this invention by forming hollow columns and channels in the aforementioned subassembly. The columns and channels are interrelated each to the other such that when they are filled with the cementitious material they will form a post and beam arrangement. In accordance with this invention, there is provided a sound building structure built at low cost in a minimum length of time. The resulting structure, when erected, exhibits high load bearing properties, i.e. high strength to weight ratios.

The materials applied to the reticulated subforms and spacer members include, for example, masonry mortar comprising Portland cement and aggregate, and synthetic compositions, e.g. plastics. Further, the cementitious skin applied to the reticulated subform is a relatively thin layer ranging from about ¾ to 1½ inches, and the resulting composite structure of this invention is capable of supporting loads substantially greater than can be supported by the individual components which have not been formed integrally.

Reference is now made to the following detailed specification and the preferred embodiments thereof, and to the accompanying drawings, in which:

FIG. 1 is a perspective view of the load bearing composite structural unit of this invention showing fragmentary views of the unit components, subassembly and completed unit;

FIG. 2 is an enlarged fragmentary view of FIG. 1 illustrating the preferred application of a priming coat of a cementitious material to the reticulated subform and further illustrating the keying of the cementitious skin to the reticulated subform;

FIG. 3 is a perspective view of a typical building structure falling within the scope of the invention;

FIG. 4 is a plan view of the foundation and footing for the building in FIG. 3;

FIG. 5 is a roof plan of the completed structure of the building of FIG. 3;

FIG. 6 is a perspective view, partly broken away, showing the details of a panel suitable for use in the building system of the invention;

FIG. 7 is a side elevational view of the panel of FIG. 6;

FIG. 8 is an end elevational view of the panel of FIG. 6, and further diagrammatically ilustrating the panel in a partially collapsed position;

FIG. 9 is a fragmentary perspective diagrammatic view of adjacent wall panels of the type illustrated in FIG. 6 to be placed in abutting alignment;

FIG. 10 is an end elevational diagrammatic view of the roof panels of the type illustrated in FIG. 6 for the building structure falling within the scope of this invention;

FIG. 11 is a fragmentary perspective view of a modified form of a panel for use in a building system falling within the scope of this invention;

FIG. 12 is a fragmentary elevational sectional view on line 12—12 of FIG. 5;

FIG. 13 is a fragmentary elevational sectional view on line 13—13 of FIG. 5;

FIG. 17 is a fragmentary sectional view illustrating a door jamb for the building structure made in accordance with the invention;

FIG. 19 is a fragmentary sectional view illustrating an alternative embodiment of a door jamb suitable for use in the building system of this invention;

FIG. 20 is a fragmentary perspective view of the wall panel and roof panel arrangement for the building structure falling within the scope of this invention, and showing the structure for a second story to the building;

FIG. 23 is a roof plan of a modified form of the building structure falling within the scope of the invention;

FIG. 24 is a vertical sectional view on the line 24—24 of FIG. 23;

FIG. 25 is a diagrammatic plan view of the building of FIG. 23 as viewed without the roof showing the relative positioning of the wall panels;

FIG. 26 is a fragmentary plan view showing in more detail the corner assemblage of the panels for the plan of FIG. 25;

FIG. 27 is a fragmentary perspective view illustrating a still further modification of the wall panel and beam structure for use in the building system of the invention;

FIG. 28 is a perspective view showing the details of the lath sheet prior to forming and inserting the lath sheet on the chord-truss of the roof panel; and FIG. 29 is a perspective view of the lath sheet of FIG. 27 showing the sheet as folded for insertion on a chord-truss system of the roof panel;

FIG. 31 is a fragmentary perspective view of still a further modification of the panel for use in the building system of the invention;

FIG. 32 is a fragmentary perspecttve view of a modifed form of the panel construction;

FIG. 33 is a fragmentary perspective view of another alternative embodiment of the panel;

FIG. 34 is a sectional view of line 34—34 of FIG. 33;

FIG. 35 is an elevational view of the panel portion of FIG. 33 showing the panel in a partially collapsed position; and FIG. 36 is an enlarged view showing one truss of the panel of FIG. 33 in collapsed position.

Referring to the drawings, wherein like reference numerals designate similar parts throughout, there is shown in FIG. 1 a specific illustrative embodiment of a load bearing composite structural building unit fabricated in accordance with this invention employed as a wall panel.

Figure 14:
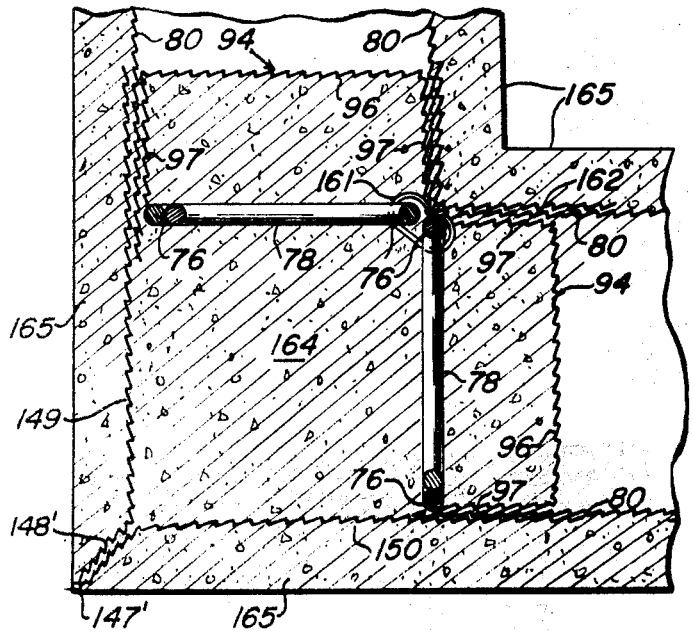
FIG. 14 is a fragmentary cross-sectional view showing the details of the corner column of a building made in accordance with the invention.

The structural unit is constructed employing lightweight components which when assembled manifest unexpected structural characteristics. The assembly of the unit is initiated by securing sheets of a reticulated subform 10 such as expanded metal lath, preferably rib lath having flat ribs 10', in spaced relation by suitable fasteners 11 such as conventional hog ring fasteners to a lightweight spacer member 12. The spacer member 12 shown is fabricated from thin gauge rod which are used for the opposed chord members 13 and 13' and the interconnecting sinuous open web 14 which is connected to the respective chord members by welding. The ribs 10' of the reticulated subform run transverse to the chord members 13 and 13'. The subassembly consisting of the spacer members 12 and the reticulated subform 10 is preferably prefabricated into conveniently sized panels which can be easily handled on the job site without the need for hoists or derricks in the placing of the subassemblies to form walls, floors or roofs. As will be hereinafter discussed, the prefabricated subassemblies preferably are constructed such that the opposed reticulated subforms can be racked or folded into a flat compact package in order to facilitate shipping.

At the job site the subassembly is unfolded and depending upon its use as a wall, floor, or roof component it is erected along with other similar subassemblies into a configuration defining the walls, floor, and roof of the building, which is being constructed.

The completion of the structural unit of this invention is shown in FIG. 1 by the use of a unit in the erection of a load bearing wall. The subassembly has been placed in a vertical position and held there by suitable means. Desirably, a channel runner 15 is provided having sufficient width to accommodate the subassembly between the upstanding flanges. A prime coat 16 of the cementitious material of construction such as a mixture of Portland cement and sand is applied to merely cover the surfaces of the reticulated subform. Although this prime coat 16 can be applied by hand, its application is facilitated by using conventional hydraulic equipment employed to apply wet concrete mix to spray the prime coat on to the desired thickness of about $\frac{1}{16}$ to $\frac{1}{8}$ inch without completely closing the openings in the subform 10. Thereafter the structural characteristics of the unit are enhanced by applying a rough intermediate coating 17 of the cementitious material of construction to the cementitious coated subassembly. The intermediate coating may be applied by hand; however, it is preferred that it be applied using hydraulic applications. The cementitious material is compounded to provide a consistency which will permit it to exude through the openings in the reticulated subform 10, and form button-like keys and surround the chord 13 which hold it in place on the subform. (See FIG. 2.)

The term "cementitious" as used herein and in the appended claims is not intended to be limited to compositions or materials containing Portland cement, but rather includes suitable materials of construction characterized by a strength comparable to masonry mortar having a compression strength of 3,000 p.s.i. after aging 28 days and by a consistency permitting exudation through the openings of the reticulated subform. The cementitious material is characterized by having a slump sufficient to permit a keying action with the reticulated members caused by the exudations of the cementitious material through the openings in the reticulated subforms. When the cementitious intermediate coating 17 has hardened it integrates the subform and spacer members into a composite structural unit whose load bearing capabilities far exceed the load bearing characteristics of the respective components of the unit.

The exposed surfaces of the unit can then be finished to satisfy the aesthetics of the building designer. A finished stucco-type coating 18 can be applied or other types of decorative treatment can be given to the unit employing brick, or other ceramics, wood, or other materials of construction. In the event that the structural unit is employed to construct a floor or roof suitable conventional finishing techniques can be utilized to finalize the functional effect for which the unit is being used.

Although the following description of this invention is directed specifically to one floor residence type of buildings it is to be understood that the invention is applicable to a variety of buildings, including multiple story residential and industrial buildings having a variety of floor plans. A typical single story residence constructed in accordance with the invention is shown in FIG. 3 and includes exterior walls 20, interior walls 21, and roof 22 and patio walls 24. The front and rear patios are optional and may be omitted from the building system.

FIG. 4 shows a plan view for the foundation for the house illustrated in FIG. 3, and FIG. 5 is a roof plan view of the house. The foundation, indicated generally by the numeral 26, is formed of suitable structural material such as concrete or the like. Where desired, the foundation provides footing for the vertical columns and horizontal beams, described hereinafter in greater detail. As illustrated in the drawing, the foundation is laid for the exterior walls 20 having footings 28, interior walls 21 having footings 30, and the patio walls 24 having footings 32. In laying the foundation, a sufficient excavation is provided to accommodate the foundation and footings. Reinforcing bars 34 (see FIG. 12) are arranged longitudinally in the excavation at a sufficient depth as not to interfere with anchoring the panels to the foundation, and the excavation is backfilled with concrete thereby encasing the reinforcing bars.

The foundation preferably is provided with a deep inset 36 for moisture control. Where desired, the entire area occupied by the house may be excavated, and the excavation backfilled with concrete. In this manner, the concrete provides both the foundation and the floor for the building. In addition, the foundation may be provided with an offset portion 37 as shown in FIG. 12.

The prefabricated panels employed in the improved building system of the present invention may be of the type described and claimed in my copending applications Ser. No. 367,849 and Ser. No. 421,250, referred to above.

FIGS. 6, 7, 8, 9 and 10 show a desired construction of a panel for a wall, roof or floor. The panel, indicated generally by the reference numeral 74, includes spaced, parallel chord wires 76 between which web wires 78 extend as diagonal truss elements, and the assembly is spot-welded at the junctions of the various wires. Spaced parallel subforms 80 formed of reticulated material, such as expanded metal lath or riblath, are attached to the chord members along opposed sides by suitable means 82, such wire ties, hog rings, tie clips or hinge clips, whereby the chord and truss system is hinged to the reticulated subform. In this manner, the panel may be collapsed as shown by the dotted lines in FIG. 8.

At both surfaces of the panel 74, the reticulated metal lath 80 extends laterally beyond the outermost chord to provide an extension 84 laterally of the chord and for a distance substantially equal to the distance between the spaced subform 80. Where desired, lateral extension 84 may be of a width greater than or less than the distance between the spaced facings of the panel but should be of sufficient width such that, when both extensions are folded inwardly, the extensions overlap. Where desired, extensions 84 may be omitted. The lath extension then can be folded inwardly to close the gap between the opposed metal lath facings. (See FIGS. 9 and 10.) In joining two adjacent panels in abutment, opposed extensions 84 for each panel may be folded inwardly and the other opposed extensions then overlap the metal lath subform of the adjacent panel. Suitable connecting means such as tie wires, or metal stitches (not shown) connect the overlapping areas.

FIG. 11 illustrates a panel structure similar to the panel shown in FIG. 6 but lath extension 84 has been omitted. In addition, lower chord 76 is provided with an integrally formed extension 86. A shear rod 88 is welded between the chords. Where desired, the lower chord may be substantially co-extensive with the reticulated subform, as is the upper chord, and shear rod 88 may be provided with an extension for projecting beyond the edge of the subform.

The prefabricated panels are used to build the walls and roof of the building, and, where desired, are used to build the floor. The building system will now be described in detail with reference to the type of panel embodiments substantially shown and described in FIGS. 6, 7, 8, 9, 10 and 11, but it should be understood that alternative embodiments for the panel, such as those described below, are also applicable. The walls of the building, including the exterior walls 20, interior walls 21 and patio walls 24, are formed of vertically disposed panels anchored or secured to the foundation. Elongated channel runner 90 is anchored to the concrete foundation by means of anchor pin 92 provided at spaced intervals. The web of the channel runner is of sufficient width to accommodate a series of wall panels 74 between upstanding flanges, and the panel is spot welded to the flanges. Adjacent vertical panels are aligned to define a common plane or wall such that the marginal edges of adjacent panels abut, and panels at the corners are brought into marginal edge abutment such that the inner, longitudinal edges of the panels abut. The adjacent panels are connected or attached by hog rings, tie wires or other suitable means (not shown), and columns are provided where desired, as described hereinbelow in greater detail.

The wall panels are provided with a longitudinal partition 94 comprising channel lath of substantially U-shaped cross section. The channel partition 94 includes web portion 96 which extends between the spaced parallel subforms of metal lath 80 of panel 74 and depending flanges 97, and is formed of a reticulated material such as expanded metal lath or riblath. (See FIGS. 14, 15 and 16.) In this manner, each panel along its marginal face defines an elongated channel extending longitudinally of the marginal edge of the panel.

There is shown in FIG. 12 a wall panel and roof panel juncture including a suitable eave overhang 98. The wall panels are disposed in a vertical position substantially as shown in the drawings and described above, and are arranged adjacent each other, and anchored to the concrete foundation by means of a suitable channel member 90. The roof panel is provided with a shear rod 100 having extension 101 disposed between upper and lower chords 76. Channel shaped closure members, indicated generally by the numeral 102, having downwardly depending flanges 104 are welded along the side of the spaced chords 76 of the wall panel. Metal lath 106 is provided along the top marginal edge of the wall panels suspended over the closure members 102. A plurality of second closure members having a web portion 110 and downwardly depending flanges 112 are welded to the marginal edges of the spaced chords 76. Elongated reinforcing bars 114 are extended over web 110 of the closure members and supported thereby. A drive-on connector or spring clip 116 having downwardly depending legs 118 and outwardly and upwardly extending flanges 120 to form pockets 122 is insertable over the reinforcing bars 114 and a weld connection is provided.

The pockets 122 formed by the flanges 120 are of sufficient diameter to accommodate elongated reinforcing bars 124 and 126 which are extended between the drive-on connectors 116. Extension 101 of shear rod 100 of the roof panel is seated upon elongated reinforcing bars 124 and 126 which are extended between the drive-on connectors 116. In this manner, a roof panel is supported between two spaced, parallel wall panels such as the wall panels for exterior wall 20 and interior wall 21.

The eave overhang 98 comprises a plurality of spaced, parallel rectangular frames 128, and the lower horizontal rib or bar 130 of the panel is longer to provide for extension 132. Diagonal 134 provides additional support to the panel. The eave overhang is enclosed with expanded metal lath 136 which is wrapped around the spaced frames. The extension 132 projects through the metal lath, and eave overhang is seated upon the oppositely disposed reinforcing bar 126.

Additional elongated reinforcing bars 138 are extended along the top edge of the roof panel and eave overhang. A drive-on connector or spring clip 140 having downwardly depending legs 142 is inserted over the reinforcing bars and is held in friction contact by spring pressure thereby retaining the reinforcing bars in place and in turn providing additional support for the eave overhang. Expanded metal lath 144 is provided along the marginal edge of the roof panel to close the gap between the panel facings to terminate the roof panel and form the beam. In this manner, the metal lath inserts 106, 136 and 144 define a channel or pumped zone for accommodating a concrete beam 146, described hereinbelow in greater detail. A corner bead 147 is provided for all exterior corners to provide a screed. The corner bead comprises a metal wing 148 having expanded metal lath extensions 149 and 150 which overlap the metal lath facings of the eave overhang.

There is shown in FIG. 13 a substantially similar wall panel and roof panel connection including a suitable eave overhang. However, for this section the eave overhang is transverse to the chord-truss system of the roof panel. Therefore, the longitudinal edge of chord 76 for the roof panel is seated in pocket 122. Metal lath is provided for the marginal edge of the roof panel to close the gap between panel facings, substantially as described above, to define a channel for a pumped zone for accommodating a horizontal concrete beam 154.

Figure 15:
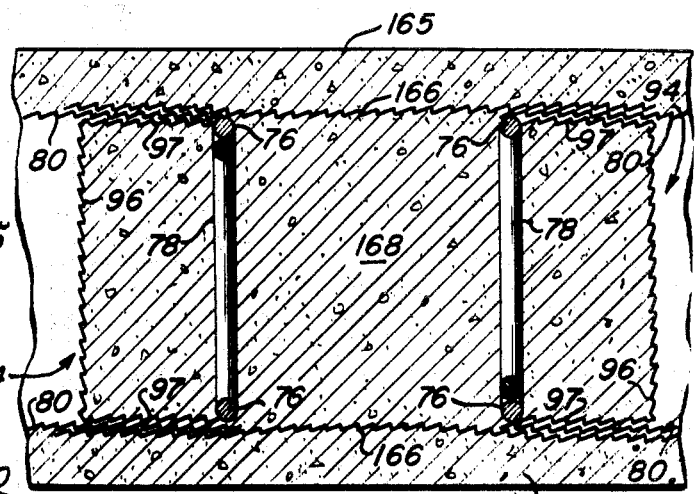
FIG. 15 is a fragmentary cross-sectional view showing the details of a wall column between abutting wall panels of a building system made in accordance with the invention.
Figure 16:
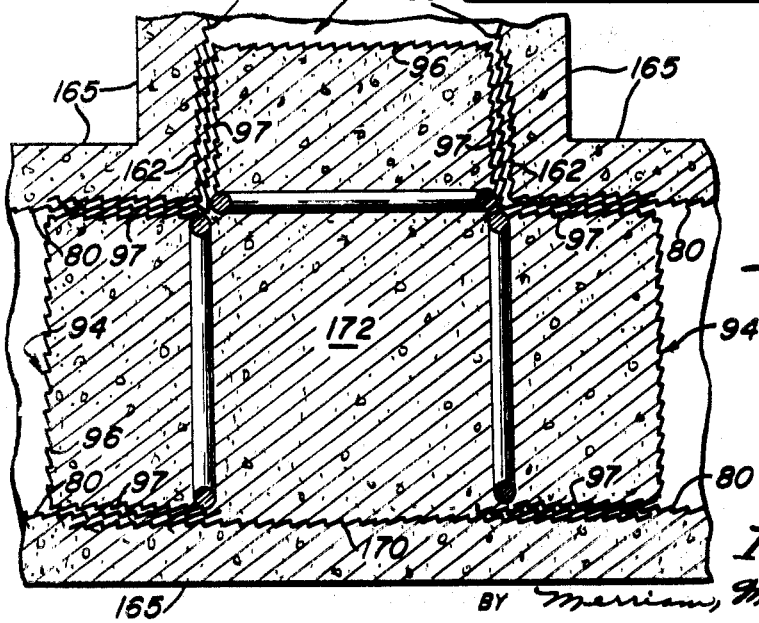
FIG. 16 is a fragmentary cross-sectional view showing the details of a T-wall column between abutting wall panels of a building system made in accordance with the invention.

FIGS. 14, 15 and 16 show in cross section the column structure formed between abutting panels. In FIG. 14, there is illustrated a corner column formed at the juncture between two panels having chords 76 and truss members 78. Where desired, the vertical abutting chords may be mechanically tied or hinged at spaced intervals by means of a tie wire or clip 161. In addition, a continuous insert 162 formed of expanded metal lath is provided at the inside corners and extends between the two panels. channel partition 94 formed of expanded metal lath is disposed longitudinally in the panel. Notice that a corner lath 147′ comprising a lath wing 148′ having elongated metal lath extensions 149 and 150, is provided at the corner to provide a screed and provide a form for concrete. Extensions 149 and 150 are formed of expanded metal lath and overlap for a short distance the outwardly disposed lath subforms 80 of the panels. In this manner, there is provided a pumped zone defined by metal lath partitions 94, metal lath subform 80 and metal lath extensions 149 and 150 to define a column. Suitable cementitious material is pumped into the zone, and the material is characterized by a slump sufficient to provide keying action with the metal lath thereby forming column 164. A cementitious coating 165 is subsequently applied to both the outside and inside of the house, as described in greater detail hereinbelow.

In FIG. 15, a wall column is formed between adjacent panels having chord members 76, truss members 78, spaced parallel subforms 80 and elongated partitions 94. After the panels have been anchored to the foundation, an elongated piece of metal lath 166 is spliced between the adjacent frames on both sides to close the gap and may be secured in place with tie wires, metal stitches or the like (not shown). In like manner, there is defined a pumped zone outlined by the metal lath parts, i.e. partitions 94 and spliced piece 166, and a suitable cementitious material is pumped to the zone to form column 168. A cementitious coating 165 is applied to the panels.

FIG. 16 illustrates a T-wall column formed at the juncture between three wall panels. The panels comprise chords 76, truss members 78 and opposed parallel facings 80. In addition, there is provided elongated channel partitions 94 and corner inserts 162. Here again, it should be understood that facings 80, partitions 94 and corner inserts 162 are formed of ribbed metal lath. An outwardly disposed partition or splice 170 comprising an elongated piece of metal lath is spliced between the adjacent panels disposed in the same plane to close the gap between the panels, and the partition 170 overlaps for a short distance the outwardly disposed facings 80. Thus, a pumped zone is defined by partitions 94 and 170 and a cementitious material is pumped to the zone to form column 172. A cementitious coating 165 is applied to the outside and inside to form the appropriate face.

Figure 18:
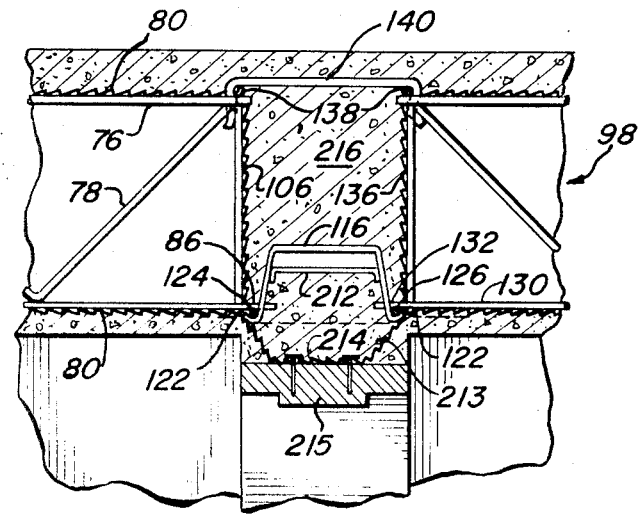
FIG. 18 is a fragmentary sectional elevational view showing details of a door jamb header.

FIGS. 17 and 18 illustrate a suitable door jamb for the building structure positioned between spaced panels forming a wall. The corner column is formed substantially as described with reference to FIG. 14, except no corner bead is provided. As shown, wall panel 174 abuts with wall panel 176 along the vertical marginal edge of each panel. The panels comprise chords 178, truss members 180 and a metal lath facing 182, and are provided with longitudinal channel partitions 184 also formed of ribbed metal lath. In addition, there is provided a second elongated channel metal lath insert 186 of substantially U-shaped configuration having depending sides 188 and 190. Insert 186 is arranged such that the web protrudes beyond the metal lath subform of wall panel 176 for a distance equivalent to the cementitious surface applied to the panel and depending side 188 extends for a sufficient distance to overlap part of the marginal side of said wall panel 176. A splice 192 comprising an elongated piece of expanded metal lath extends between depending side 190 and facing 182 of panel 174. In this manner, partitions 184, insert 186 and splice 192 define a pumped zone for forming a vertical column 194 of cementitious material, substantially as described above. Before the column is pumped, door jamb is nailed, stapled, or otherwise secured in place.

The opposed door jamb 198 is secured to wall panels 200 comprising chord and truss members and having opposed parallel subforms 206 formed of metal lath, as described above. The wall panel is also provided with a longitudinal channel partition 206. A second longitudinal partition 208 of substantially U-shaped cross section is nested with partition 206 on inverted disposition, thereby forming a substantially enclosed rectangular zone which defines a pumped zone for forming a cementitious column 210. Door jamb 198 is attached to the column in alignment with door jamb 196 before the column is pumped.

FIG. 18 illustrates the details for the door jamb header, as well as showing a modification for connecting the eave overhang with the roof panel. A channel runner 212 is arranged on inverted disposition atop the wall panel, and the depending flanges of the channel runner may be spot welded to the panel. A drive-on connector or spring clip 116 is insertable over the channel runner, and reinforcing bars 124 and 126 are supported by the pockets 122 substantially as described with reference to FIG. 12. In this manner, the roof panel and the eave overhang are supported by the reinforcing bars 124 and 126. There is provided in addition reinforcing bars 138 and drive-on connector or spring clip 140 for further support of the eave overhang. Expanded metal lath inserts 106 and facing 136 are provided as described with reference to FIG. 12. Elongated metal lath inserts 213, of substantially U-shaped configuration, depends downwardly from the roof panel and the eave overhang and is provided with flat base portion 214 to which the jamb header 215 is attached by nails, staples or the like. A cementitious horizontal beam 216 is formed in the pumped zone defined by metal lath inserts 106, 136 and 213, and a cementitious face 217 is subsequently applied.

An alternative embodiment for the door jamb is shown in FIG. 19. The lateral extensions 84 of the metal lath subform 80 of the wall panel are folded inwardly to close the gap between the opposed subforms. An elongated channel member 218 formed of light gauge metal is inserted over the longitudinal marginal portions of subforms 80, and a cementitious surface 219 is applied. An appropriate door jamb 220 formed from wood or metal is secured to the channel member 219, and, as shown, the two jambs are aligned between spaced wall panels. A suitable door panel insert, including a transom section, is inserted at the appropriate place between wall panels 74 (see FIG. 3), and hinge 221 is provided for the door 222 and is shown in a partly opened position by the dotted lines. Window panel inserts are provided at desired places in substantially the same manner.

After the wall panels and roof panels have been secured in place, and the desired door panel inserts aand window panel inserts provided, the vertical columns and horizontal beams are formed in the above described pumped zones. The columns and beams are formed of cementitious material characterized by a slump sufficient to provide keying action with the expanded metal lath. The particular cementitious material employed will vary depending upon such factors as materials available and governmental building codes. In general the cementitious material is a masonry mortar comprising cement and sand or other suitable aggregate which are admixed with water. The admixture is then pumped into the desired zones, and upon settling and hardening, keys with the metal lath.

A continuous sheet of cementitious material of construction is applied to both metal lath subforms of the wall panels and roof panels. Here again, the cementitious material is a masonry mortar. In accomplishing this, there is first provided a priming coat 223. (See FIGS. 12 and 13.) The priming coat may be troweled or pump sprayed onto the lath. After the priming coat has dried sufficiently, a brown coat 224 is applied, desirably by pumping means. A suitable brown coat for a building of this invention is approximately one inch in thickness. A final white coat 225, or other suitable finishing coat, is then troweled or pumped over the brown coat to bring the wall to the desired full thickness and to provide a smooth surface.

Where desired, a multi-story building may be erected. FIG. 20 illustrates the erection of a wall panel for a second story. Elongated channel runner 90 is anchored to the completed roof for the first floor over horizontal beam 226, and the wall panels 74 secured in position, and the roof panels then assembled, substantially as described above. Where desired, the necessary columns and beams may be provided for the second story, and the structure built into a multi-story dwelling.

Where desired, insulating material (not shown) may be provided between the spaced metal lath subforms for the wall panels, floor panels and/or roof panels. The insulating material may be incorporated in the panel before or after installation. Also, plumbing conduits and electrical conduits may be run through the various panels, and desired outlets provided where required, and duct or air plenums may be passed through the panels.

Figure 21:
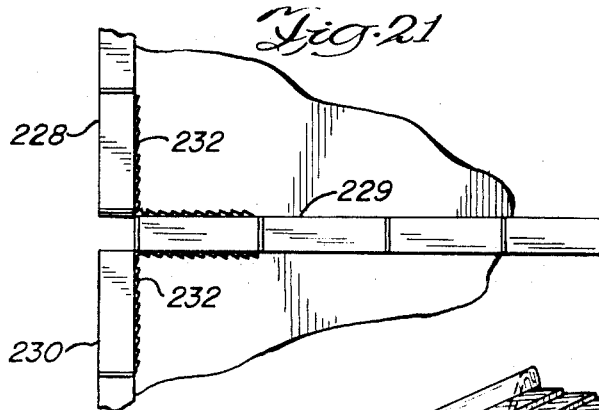
FIG. 21 is a diagrammatic view in plan showing a modification for the wall panels for use in the building system of the invention.
Figure 22:
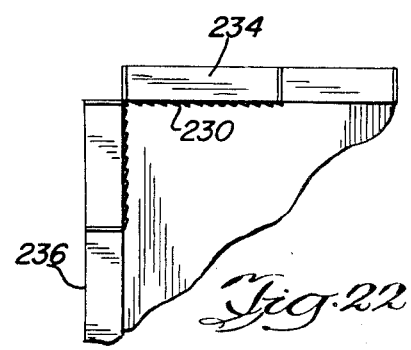
FIG. 22 is a diagrammatic view in plan illustrating a modification for the wall panels for use in the building system of the invention.

FIGS. 21 and 22 show diagrammatically in plan view vertical wall sections comprising two or more prefabricated panels formed as a unit and folded one upon the other. The panels are opened at the building site and installed at the proper position.

FIG. 21 illustrates a T-panel construction comprising three prefabricated panels 228, 229 and 230, formed substantially as described above, which may be shipped as a unit, one frame folded upon another, and opened in the field. In the construction of the frames, a continuous piece of metal lath 232 is secured to the sides of the panels to extend around the corners between adjacent panels thereby forming a hinge between adjacent panels. Metal lath piece 232 may be attached to the lath facing of the panels by means of metal stitches, tie wires or other suitable means. The vertical marginal edge formed at the juncture between abutting frames along metal lath piece 232 provides a hinge line, whereby panel 228 may be folded to lay on panel 229, and panel 230 may be folded back upon panel 229. Where desired, a vertical column of cementitious material may be formed at the T-joint, substantially as described above.

FIG. 22 illustrates a corner column construction formed by two prefabricated panels 234 and 236 of the type described above. As described with reference to FIG. 21, a continuous piece of metal lath 230 is provided around the corner of the panels thereby forming a hinge. In this manner, panel 234 can be folded back upon panel 236 at the hinge line formed at the marginal edge between the abutting panels. A corner column of cementitious material may be provided as described above.

Construction of the panels in this manner as shown in FIGS. 21 and 22 provides two significant advantages. First, the panels are assembled at the plant to form a wall section and then folded one upon another to provide a compact package for shipping. As a second advantage, a complete wall section may be installed at the proper place according to the building plan, thereby obviating the necessity of matching separate panels and simplifying or eliminating to a large extent the need for mechanically tying abutting panels.

An alternative embodiment of the invention is shown in FIGS. 23, 24, 25 and 26. There are provided wall panels and roof panels comprising a chord and truss system, indicated generally at 240, and having spaced parallel metal lath subforms 241 including lateral extensions 242, substantially as described above with reference to FIG. 6. Each wall panel is closed at the top by means of an inverted channel runner 244 having a web of sufficient width to accommodate the panel. The adjacent wall panels may be joined as described with reference to FIG. 9. The wall panels at the corners are joined in overlapping abutment with the lateral extensions folded inwardly to close the gap between the spaced facings. (See FIG. 26.)

The roof comprises a plurality of prefabricated panels disposed horizontally and supported by the wall panels. The roof panels desirably are of deeper cross section than the wall panels in order to achieve greater resistance to deflection, and a plurality of shear rods 246 spaced at regular intervals are incorporated into the roof panel to provide additional support. The roof panels extend across the top of the channel runners 244 and are supported by the wall panels. Here again, the lateral extensions 242 are folded and adjacent roof panels joined substantially as described with reference to FIGS. 9 and 10. Where desired, there is provided at the juncture between the wall panel and roof panel, a corner reinforcement 250 comprising a continuous, elongated piece of metal lath bent at a right angle and secured to the metal lath subform 241 of the panels. The corner bead 252 is provided with wing projection 254, formed of metal lath, one of which overlays the outwardly disposed subform of the roof panel and the other extending across the opened end of the roof panel and overlapping for a short distance the outwardly disposed subform of the wall panel. A cementitious skin 256 is provided for both the exterior and interior walls of the building.

A still further modification is illustrated in FIGS. 27, 28 and 29, which modification is particularly useful in forming horizontal beams. The building structure includes prefabricated wall panels 258 (shown diagrammatically) and roof panels 260 formed of a chord and truss system, substantially as described above, but the metal lath subform was omitted from the panels for the purpose of clarity. A rectangular sheet 262 of metal lath substantially the length of the roof as measured transverse to the chord and truss system is provided with a plurality of openings 264 at regular intervals corresponding to the position of each chord and truss of the roof panel. After the roof panel has been secured in place, the metal lath sheet 262 is laid along the marginal edge of the panel transverse to the chord and truss and each chord-truss is inserted through an opening. The metal lath sheet 262 is folded in such a manner as to provide an elongated channel opening at the top and having a backwardly extending fold 266 to overlap for a short distance the outwardly disposed metal lath subform of the roof panel. The channel shaped lath sheet 262 is secured in place by metal stitches, tie wires or the like (not shown). The elongated channel thereby defines a pumped zone to accommodate a horizontal beam formed of a cementitious material.

Figure 30:
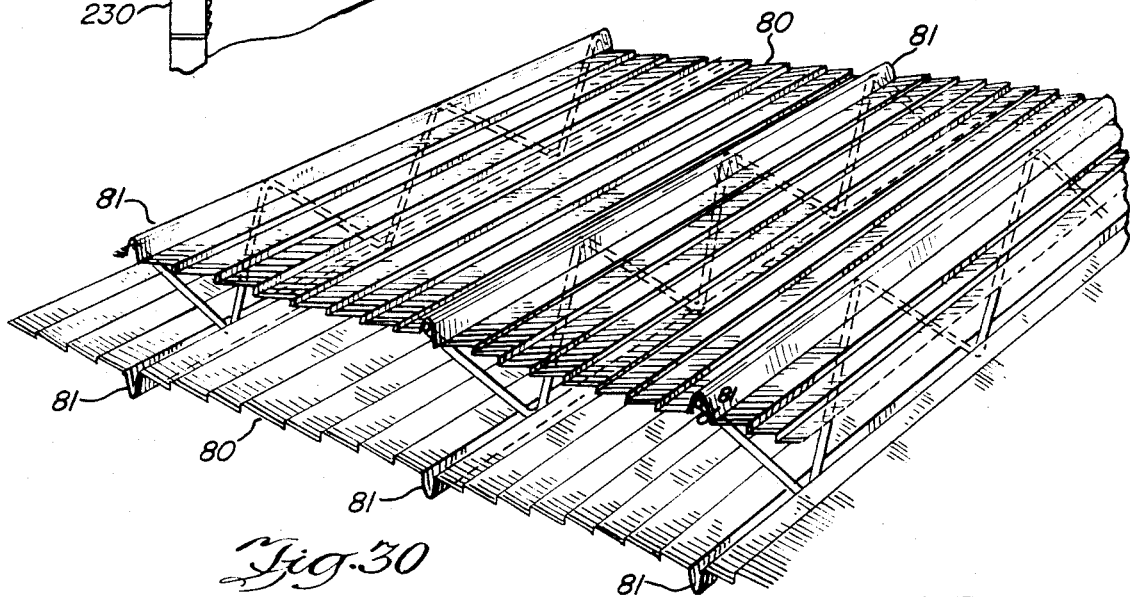
FIG. 30 is a fragmentary perspective view of a modification of the panel for use in the building system of the invention.

FIG. 30 illustrates a still further modification of a panel structure useful for the invention, and similar to the panel shown in FIG. 12. Here, however, reticulated subform 80 is formed from riblath having flat ribs 81. In this construction, the opposed chord members are omitted, end sinuous web truss members extend between flat ribs 81 of spaced subforms 80 and are attached thereto as by welding.

Referring to FIG. 31, there is shown an enlarged, fragmentary perspective view of panel 38 for a wall, roof or floor. The panel comprises a chord and truss system as spacer members, and includes a plurality of parallel chords 40 and 42 arranged in spaced pairs to accommodate a truss comprising connectors 44 and diagonals 46. In each chord, a longitudinally extending recess 48 of substantially semi-circular cross section opens inwardly to accommodate the truss members.

Connectors 44, of generally rectangular shape, extend between the spaced chords 40 and 42 along the end thereof, and are provided with opposed, parallel sides 49. Rods 50, adaptable for seating engagement in recesses 48, are welded in the recesses, and sides 49 of connectors 44 are secured to the rods. Diagonals 46 extend between the spaced chords 40 and 42 and terminate in relatively short, parallel, opposed end portions 52 and adaptable for seating engagement in recesses 48. The diagonals 46 run longitudinally of the chords between connectors 44 such that the end portions 52 of the outermost diagonal abuts rod 50 and the end portions 52 of the diagonals abut adjacent ends of complementary intermediate diagonals, and the abutting members are welded. Truss bridging members 54, comprising metal rods, extend between adjacent chords in the same plane and are secured thereto as by welding. In addition, reinforcing rods 56 extend between adjacent chords in the same plane for the full width of the panel and run transverse of the diagonals over recesses 48, and are secured to the chords as by welding. Reticulated material 58, such as expanded metal lath or riblath, is secured between chord members to provide a subform for concrete, plaster, masonry or the like. The metal lath may be attached by means of hog rings, tie wires or metal stitches (not shown) or may be spot welded to the chords.

Where desired, the panel may be constructed as shown in FIG. 32. Here, rods 50 are omitted, and connectors 44 have opposed parallel sides adaptable for seating engagement in recesses 48. End portions 52 of connectors 44 abut sides 49 of the connector, and are welded in position.

Referring to FIGS. 33, 34, 35 and 36, there is shown another embodiment of the panel suitable for use in my invention. There is shown an enlarged, fragmentary perspective view of a wall or roof panel 60, comprising spacer members including a chord and truss system. The panel includes opposed, parallel chords 62 and 63 having longitudinal recesses 64 interconnected by trusses 65, substantially as described above with respect to FIGS. 31 and 32.

In order that the panels and associated trusses may be collapsed into a compact shipping package, each truss 65 is hingedly connected to the upper and lower chords 62 and 63 by means of a plurality of longitudinally spaced hinge members 66 arranged in recesses 64, details of which are illustrated in FIG. 34. Each hinge member comprises a tube or sleeve 67, having a portion of the exterior wall thereof welded at 68 to the inner wall of one of the recesses 63. The trusses are provided with a cut-out portion 69 to accommodate the opposite or "free" surface of the tube 67. A shaft 70 extends longitudinally through adjacent tubes and is journaled therein. The portion 70a of the shaft 70 which extends between adjacent tubes is rigidly connected to the truss 65 by means of eyelets 72 formed by bending the end portion of the truss around the shaft.

By reason of this construction, wherein the truss sections are hingedly connected to the upper and lower chords 62 and 63, the panels may be collapsed as shown by the dotted lines in FIGS. 35 and 36. The panels thus can be shipped as a more compact unit thereby conserving on shipping space and resulting in substantial savings.

It will be observed from the foregoing discussion that there can be provided column and beam construction of reinforced concrete. As described above, the elongated channel extending longitudinally of the marginal edge of the panel defines a pumped zone for a column or beam. Thus, upon adjacent disposition of paired subassemblies in marginal edge abutment, an enclosed zone is defined by the reticulated channels for accommodating a column or beam of reinforced concrete. Where desired, reinforcing bars may extend through the zone and the concrete poured in place. The concrete keys with the reticulated channels by exuding through the openings thereby forming an integral structure.

It is understood that the foregoing description has been given for clearness of understanding only, and modifications will be obvious to those skilled in the art. Thus, for example, the spacer members for maintaining the subforms in spaced relation may be formed from a substantially solid elongated member, or may comprise a plurality of discontinuous members spaced between the opposed, parallel chords or the flat ribs of the riblath. In the suitable construction of a panel, such as of the embodiment illustrated in FIG. 6, the truss components used were fabricated from No. 2 (0.262 inch diameter) bright basic wire with a minimum yield of 80,000 p.s.i. The lath used in the construction was 3.4 pounds per square yard flat-riblath. Likewise, the cementitious material of contsruction may be modified, and a suitable mortar used was made from an admixture of portland cement and sand in a ratio of 1:3½.

The structural composite framework of this invention is load bearing, and in this respect is comparable to masonry, reinforced concrete, or wood framing. Equally important characteristics of the framework are its light weight and ease of installation, which enables completion of a building frame in substantially less time than required by conventional means, with resultant savings in time and expense. Additional attendant advantages of this invention are that relatively unskilled labor may be employed in the erection of a building using the composite structural units, and that many local materials may be employed such as the cementitious material. Still further, a building made in accordance with this invention, is fireproof, vermin and termite resistant and free of dryrot. The composite structural units of this invention provide flexibility to suit the design criteria for the building needs, and as a monolithic structure eliminates joints.

Still further, little maintenance is required and a building of this invention could be expected to have relatively long life. Installation of utilities and attachment of fixtures is also readily provided.

What is claimed is:
1. A building structure comprising:
   a plurality of interconnected composite load-bearing panel assemblies, said panel assemblies comprising;
   a plurality of prefabricated units each having a pair of spacially separated reticulated subforms and a plurality of lightweight, relatively low load-bearing wire-like trusses spacially separating and integrally attached to said reticulated subforms to form a self-supporting framework;
   each of said wire-like trusses having opposed parallel chords and an open web portion interconnecting said chords forming said truss members;
   said opposed chords lying immediately adjacent and substantially coextensive with each of said reticulated subforms;
   means for anchoring a plurality of said units adjacently disposed in a vertical position;
   means for supporting horizontally a plurality of said units adjacently disposed between said vertically disposed units;
   a continuous skin of cementitious material of construction respectively covering each of said reticulated subforms;
   said cementitious material having sufficient slump characteristics to exude through openings in said subforms and substantially surround each of said opposed chords of said wire-like trusses lying immediately adjacent each of said reticulated subforms;
   said open web portions between said chords being substantially free of said cementitious material;
   said continuous skin of cementitious material, said reticulated subforms, and said wire-like trusses keyed together by said exudations of said cementitious skin material substantially throughout the length of said opposed chords of said wire-like trusses into a plurality of composite load-bearing panel assemblies, each of said interconnected composite assemblies capable of supporting an axial and flexural load substantially greater than the loads which would be expected from the respective load-bearing characteristics of the prefabricated units, anchoring and support means, and cementitious skin components of said assemblies;
   elongated vertical hollow columns formed of metal lath and extending longitudinally of said trusses along said subforms at marginal edges between at least some of the adjacent vertical units, said columns defined by said subforms and respective pairs of metal lath inserts extending between said subforms;
   one pair of said inserts overlapping the respective marginal edges between adjacent subforms, and the other pair of said inserts extending between respective opposite subforms on either side of the marginal edges;
   elongated horizontal hollow beams formed of another metal lath insert between at least some of the adjacent vertical and horizontal units; and
   a cementitious material applied to said hollow columns and beams to fill the same and thereby form structural vertical columns and horizontal beams.

2. A building structure according to claim 1, including elongated vertical hollow corner columns formed of metal lath and extending longitudinally of said trusses along said subforms at corners between adjacent vertical units, said columns defined by said subforms and respective pairs of metal lath inserts extending between said subforms,
   one pair of said inserts extending from respective subforms towards said corner, and the other pair of said inserts extending between respective opposite subforms on either side of the corner, and
   a cementitious material applied to said hollow corner columns to fill the same and thereby form structural vertical corner columns.

3. A building structure according to claim 1, including elongated vertical hollow T-wall columns formed of metal lath and extending longitudinally of said trusses along said subforms at marginal edges between some of the adjacent vertical units and other vertical units transversely disposed thereto, said columns defined by said subforms and respective groups of metal lath inserts extending between said subforms,
   one group of said inserts overlapping the respective outer marginal edges between adjacent subforms, and the other group of said inserts extending between respective opposite subforms on either side of the marginal edges, and
   a cementitious material applied to said hollow T-wall columns to fill the same and thereby form structural vertical T-wall columns.

4. A building structure according to claim 1, including means for hingedly connecting said subforms to said trusses.

References Cited
UNITED STATES PATENTS

| | | | |
|---|---|---|---|
| 1,280,530 | 10/1918 | Parker | 52—356 |
| 1,637,410 | 8/1927 | Coryell | 52—661 |
| 1,821,015 | 9/1931 | Hull | 52—349 |
| 2,035,172 | 3/1936 | Lurie | 52—357 |
| 2,139,749 | 12/1938 | Herbest | 52—661 |
| 2,250,798 | 7/1941 | Gibson et al. | 52—349 |
| 2,408,781 | 10/1946 | Karelius | 52—661 |
| 3,344,571 | 10/1967 | Day | 52—353 |

OTHER REFERENCES
Kahn System Publication of 1910.

FRANK L. ABBOTT, Primary Examiner

JAMES LEE RIDGILL, JR., Assistant Examiner

U.S. Cl. X.R.

52—275, 281, 378, 383, 645, 672